Nov. 23, 1965  J. M. KREINER ET AL  3,218,989
BOLSTER BEARING
Filed June 27, 1962
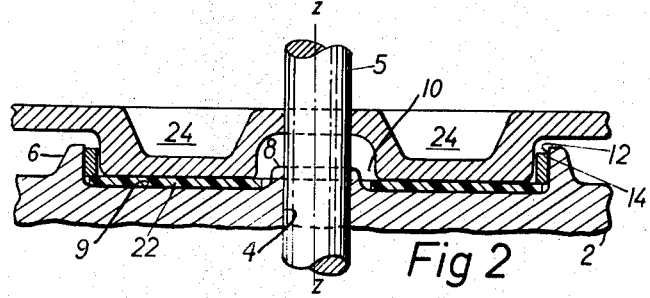
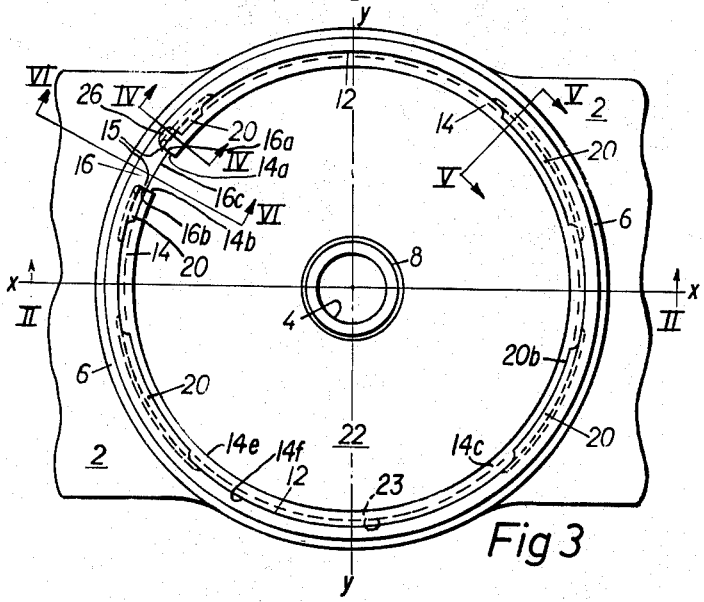
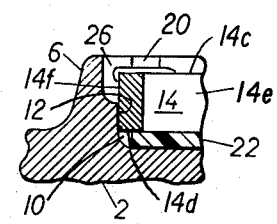
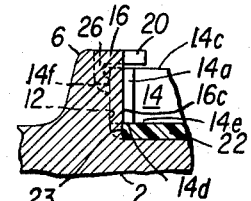
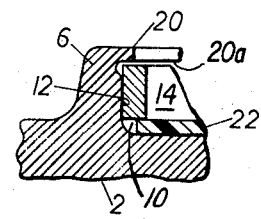
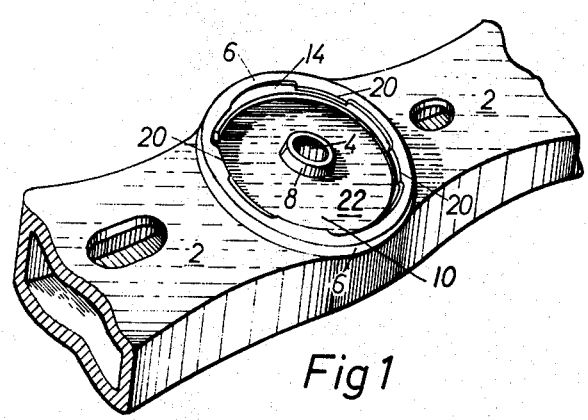
INVENTORS
HANS B. WEBER
JOSEPH KREINER
BY Henry Kozak ATTY United States Patent Office 3,218,989
Patented Nov. 23, 1965

3,218,989
BOLSTER BEARING
Joseph M. Kreiner, Cleveland Heights, and Hans B. Weber, Bedford, Ohio, assignors, by mesne assignments, to Midland-Ross Corporation, Cleveland, Ohio, a corporation of Ohio
Filed June 27, 1962, Ser. No. 205,792
6 Claims. (Cl. 105—200)

This invention relates to an improved car truck providing for resistance to wear between the car truck bolster and associated car body.

One of the problems currently confronting the railroads is the rising cost of equipment maintenance. Among the more troublesome maintenance problems is wear of the car truck bolster at its area of contact with the car body. The herein disclosed invention provides a unique yet simple means to preclude excessive wear between the railroad car body and car truck bolster. The invention herein disclosed resides in providing the car truck bolster with an annular wear band means adapted to hold the usually employed bolster liner in position and to protect the bolster center plate flange from damaging contact with the car body center plate.

It is therefore the primary object of this invention to provide a railway car truck with means adapted to prevent the truck bolster from being subjected to excessive wear due to contact with car body center plate.

It is a specific object of this invention to provide a car truck bolster with annular wear band means adapted for abutting engagement with the bolster center plate flange to protect the flange from wear resulting from contact between the car body center plate and flange, and to maintain the bolster liner in full surface-to-surface contact with the bolster.

It is a still more specific object of this invention to provide a car truck bolster with a wear resistant ring-like structure that may be inserted in the car body center plate recess to prevent the car body center plate from contacting the bolster center plate flange during use to thereby alleviate wear.

These and other objects will become more apparent from the following description and claims in which:

FIG. 1 is a perspective view of a portion of a car truck bolster embodying the invention;

FIG. 2 is a sectional view taken along line II—II of FIG. 3 showing a car body center plate superimposed in the center plate receiving recess of the bolster;

FIG. 3 is a fragmentary plan view of a car truck bolster embodying the invention;

FIG. 4 is a fragmentary sectional view taken along line IV—IV of FIG. 3;

FIG. 5 is a fragmentary sectional view taken along line V—V of FIG. 3;

FIG. 6 is a fragmentary sectional view taken along line VI—VI of FIG. 3.

Referring to FIG. 1, there is shown a perspective partial view of a car truck bolster 2 embodying the invention. In coaxial alignment with a vertical axis $z$—$z$ of the bolster, there is arranged the usual centrally disposed king pin opening 4. A conventional king pin 5 (FIG. 2) is inserted into the opening to pivotally connect the truck to the car body. The bolster has a concentrically disposed center plate flange 6 that defines the perimeter of a center plate receiving recess 10 having a circular floor 9. Circumferentially disposed about the pin opening 4 is a boss 8. The boss 8 is of conventional construction and is well known in the art. Disposed within the center plate recess 10, and in abutting engagement with the inner surface 12 on the flange 6, is a circumferentially compressible wear band 14. The band 14 is of a one piece construction and is formed in the shape of an annular ring having end portions 14a and 14b in spaced opposed relation to define a gap 15. The band comprises upwardly and downwardly facing surfaces 14c and 14d, respectively, joining inner and outer concentric concave surfaces 14e and 14f. The band 14 is preferably under a slight compressive force when positioned within the recess to assure full surface-to-surface engagement with the flange 6. Furthermore, the band 14 is spring-like in that it will exert a force radially outwardly when subjected to a compressive action.

The flange 6 has a first stop means, such as a lug 16, positioned on the flange approximately midway between the horizontal axes of the bolster, i.e., longitudinal axis $x$—$x$ and transverse axis $y$—$y$ at right angles therewith. The lug comprises a pair of circumferentially spaced parallel vertical surfaces 16a and 16b that extend upwardly from the floor 9 and project radially inward from the flange to merge with a vertical concave surface 16c. The location of the lug 16 is important in that the ends 14a and 14b of the band 14, which are prone to wear, are located in abutting engagement with portions of the surfaces 16a and 16b. If the ends of the band 14 were located on either the longitudinal or transverse axis of the bolster, the wear of the band ends may create other problems. This means that the lug 16 may be located in any one of four positions on the flange approximately midway between the points where the two axes cross the flange 6.

Flange 6 is provided with a second stop means, such as lugs 20, to maintain the band 14 in contact with the liner 22 disposed on the floor of the center plate recess 10 of the bolster. The lugs structurally overhang the floor, i.e., they are positioned radially about the recess 10 and project inwardly from the upper portion of the flange in spaced relation to the floor and in superimposed relation to the band 14 to form a downwardly facing arcuate surface 20a and a concave surface 20b. Lugs 20 preclude any portion of the band 14 from working upwardly.

Once in position, band 14 performs a dual function, the first to preclude wear on the flange 6 by the car body center plate 24, and second, to act to retain the liner 22 in its position without the action of the movable center plate 24 from tearing the liner edges 23. The bolster, when angled in response to curves in the track, pivots about the king pin relative to the center plate 24. Thus, it becomes apparent that the band 14 serves to hold liner 22 in a fixed position in the center plate recess and precludes mutilation of the liner 22.

To insert the band 14 in its operative position it is merely necessary to insert one end of the band into the center plate recess in abutting engagement with the lug 16 and then force the remainder of the band into position.

To remove the band from its position on the bolster, the above outlined procedure is reversed. Referring to FIG. 4, a pinch bar or similar tool is inserted in the recess 26 in the flange 6. The recess enables the point of the tool to be positiond behind the band and to force the band inwardly by the lever action of the pinch bar. The presence of a lug 20 immediately adjacent the recess 26 precludes the band from working upwardly in service and does not hinder the removal of the band.

The invention herein disclosed resides in providing the bolster of a car truck with a wear resistant band that prevents the bolster flange from being distorted by wear caused by the car body center plate, and that is adapted to hold the bolster liner in its operative position.

The terms and expressions which have been employed are used as terms of description and not of limitation and there is no intention of excluding such equivalents of the invention described or of the portions thereof as fall within the purview of the claims.

What is claimed is:

1. A car truck bolster having a king pin opening concentric to a normally vertical axis, and normally horizontal longitudinal and transverse axes in right angle relationship, said bolster comprising:
   (a) an annular flange concentric to said pin-opening axis generally defining the perimeter of a center plate receiving recess; an annular floor defining the bottom of said recess;
   (b) metallic wear band having a gap in its circumference normally positioned along the inner circumference of the flange, said band having an upwardly facing surface and a downwardly facing surface; and
   (c) means coacting between the flange and the band to position the end portions of the band adjacent said gap in fixed relation with the flange between said horizontal axes.

2. A car truck bolster according to claim 1 wherein:
   (a) said cooperating means comprises a plurality of stop means on the flange engageable with said upwardly facing surface and said end portions of the band for precluding upward as well as rotational movement of said band relative to said flange to maintain the band in said fixed relationship.

3. A car truck bolster according to claim 2 wherein:
   (a) said plurality of stop means comprises a first stop means on the flange extending radially inward therefrom adjacent said floor and approximately midway between said horizontal axes to preclude rotational movement of said band about said pin opening; and
   (b) a second stop means on the flange arranged circumferentially thereabout in overhanging relation to said floor to preclude vertical displacement of said band relative to said flange.

4. A car truck bolster according to claim 1 wherein:
   (a) said cooperating means comprises circumferentially spaced and inwardly projecting lugs spaced from said floor in superimposed and engageable relation with said upwardly-facing surface of the band to preclude vertical displacement of the band relative to said bolster.

5. A car truck bolster according to claim 1 wherein:
   (a) said cooperating means comprises a lug having two oppositely facing parallel vertical surfaces extending upwardly from the floor and radially inward from the flange between said horizontal axes, said surfaces providing portions thereof engageable with end portions of the band defining said gap.

6. A car truck bolster according to claim 1 comprising:
   (a) a circular bolster liner having a peripheral outer edge, said liner confined in the recess with said edge disposed between said downwardly facing surface and said floor.

References Cited by the Examiner
UNITED STATES PATENTS

| | | | |
|---|---|---|---|
| 1,094,185 | 4/1914 | Adams | 308—137 |
| 1,144,644 | 6/1915 | Elliott et al. | 308—223 |
| 1,243,387 | 10/1917 | Coleman | 208—137 |
| 2,258,640 | 10/1941 | Beckette | 105—199 X |
| 2,321,429 | 6/1943 | Smith. | |
| 2,514,034 | 7/1950 | Dean | 105—199 |
| 2,558,069 | 6/1951 | Alben | 105—199 X |

MILTON BUCHLER, *Primary Examiner.*

LEO QUACKENBUSH, *Examiner.*